US012694815B2

(12) United States Patent
Liu et al.

(10) Patent No.: US 12,694,815 B2
(45) Date of Patent: Jul. 28, 2026

(54) DISPLAY PANEL, DRIVING CONTROLLER AND PIXEL CIRCUIT DRIVING METHOD

(71) Applicant: E Ink Holdings Inc., Hsinchu (TW)

(72) Inventors: Shu-Cheng Liu, Hsinchu (TW); Hsiao-Lung Cheng, Hsinchu (TW); Pei-Lin Tien, Hsinchu (TW); Chi-Mao Hung, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/986,719

(22) Filed: Dec. 19, 2024

(65) Prior Publication Data

US 2025/0209961 A1 Jun. 26, 2025

(30) Foreign Application Priority Data

Dec. 21, 2023 (TW) ................................ 112150161

(51) Int. Cl.
*G09G 3/20* (2006.01)

(52) U.S. Cl.
CPC ... *G09G 3/2092* (2013.01); *G09G 2320/0285* (2013.01); *G09G 2330/028* (2013.01)

(58) Field of Classification Search
CPC ......... G09G 3/2092; G09G 2320/0285; G09G 2330/028
See application file for complete search history.

(56) References Cited

U.S. PATENT DOCUMENTS

| | | | | |
|---|---|---|---|---|
| 8,665,297 | B2 * | 3/2014 | Park | G09G 3/3648 345/88 |
| 10,197,838 | B2 | 2/2019 | Nam et al. | |
| 10,311,812 | B2 | 6/2019 | Lee et al. | |
| 10,467,978 | B2 | 11/2019 | Oh et al. | |
| 10,559,280 | B2 * | 2/2020 | Bae | G09G 3/2092 |
| 11,514,848 | B2 * | 11/2022 | Kim | G09G 3/32 |

(Continued)

FOREIGN PATENT DOCUMENTS

| | | |
|---|---|---|
| CN | 101226725 A | 7/2008 |
| CN | 115376454 A | 11/2022 |

(Continued)

OTHER PUBLICATIONS

The office action of corresponding TW application No. 112150161 issued on Oct. 25, 2024.

*Primary Examiner* — Jose R Soto Lopez
(74) *Attorney, Agent, or Firm* — CKC & Partners Co., LLC

(57) ABSTRACT

A pixel circuit driving method comprising: receiving an image signal, wherein the image signal comprises multiple pixel values; using a first lookup table to obtain multiple first voltage data corresponding to the multiple pixel values in a first original frame; using a second lookup table to generate a multiple first voltage combinations according to the multiple first voltage data, wherein each of the multiple first voltage combinations comprises multiple update voltages, and the multiple first voltage combinations correspond to a multiple first update frames; generating the multiple update voltages to multiple driving multiplexing circuits according to each of the multiple first voltage combinations by multiple power generating circuits; and using the multiple update voltages as multiple driving voltages to provided to multiple pixel circuits by the multiple power generating circuits.

13 Claims, 8 Drawing Sheets

(56) References Cited

U.S. PATENT DOCUMENTS 11,783,752 B2 * 10/2023 Kim .................... G09G 5/005 345/694
11,837,167 B2 * 12/2023 Kim .................... G09G 3/3233
2005/0030306 A1 * 2/2005 Lan .................... G09G 5/363 345/211
2006/0044249 A1 * 3/2006 Lee .................... G09G 3/3611 345/98
2007/0063956 A1 * 3/2007 Jong .................... G09G 3/3648 345/98
2007/0195040 A1 * 8/2007 Park .................... G09G 3/3648 345/89
2007/0263017 A1 * 11/2007 Umeda .................... G09G 3/3611 345/691
2008/0239157 A1 * 10/2008 Rai .................... H04N 5/202 348/674
2009/0040163 A1 * 2/2009 Sun .................... G09G 3/3696 345/98
2009/0267965 A1 * 10/2009 Han .................... G09G 3/3607 345/690
2010/0007680 A1 * 1/2010 Yu .................... G09G 5/10 327/530
2013/0057568 A1 * 3/2013 Liao .................... G09G 3/3648 345/589
2013/0100168 A1 * 4/2013 Lin .................... G09G 5/003 345/660
2014/0146071 A1 5/2014 Kim et al.
2016/0189635 A1 * 6/2016 Lee .................... G09G 3/3291 345/77
2016/0365019 A1 * 12/2016 Lee .................... G09G 3/3688
2019/0122636 A1 * 4/2019 Tang .................... G09G 5/10
2019/0156728 A1 * 5/2019 Yu .................... G09G 3/2092
2021/0201779 A1 * 7/2021 Kim .................... G09G 3/3233
2021/0398494 A1 * 12/2021 Kwon .................... G09G 5/06
2022/0328012 A1 * 10/2022 Lim .................... G09G 3/3291
2023/0055288 A1 * 2/2023 Lee .................... G09G 3/3275
2023/0063249 A1 * 3/2023 Tsuchi .................... G09G 3/3688
2023/0237949 A1 * 7/2023 Kim .................... G09G 3/3225 345/690
2024/0346963 A1 * 10/2024 Yim .................... G09G 3/2007

FOREIGN PATENT DOCUMENTS

TW 200514004 A 4/2005
TW 200937380 A 9/2009

* cited by examiner

DISPLAY PANEL, DRIVING CONTROLLER AND PIXEL CIRCUIT DRIVING METHOD

CROSS-REFERENCE TO RELATED APPLICATION

This application claims priority to Taiwan Application Serial Number 112150161, filed Dec. 21, 2023, which is herein incorporated by reference in its entirety.

BACKGROUND

Technical Field

The present disclosure relates to the control and driving of pixel circuits, especially a display panel, a driving controller and a pixel circuit driving method.

Description of Related Art

In various consumer electronic products, "reflective display device" is widely used in display screens, such as electronic paper display device. The reflective display device uses incident light to illuminate a display medium layer to achieve a display effect, and therefore save power. However, in order to balance the display capability and production cost of the reflective display device, there are still many parts that can be improved in the internal circuit structure and signal processing of the reflective display device.

SUMMARY

One aspect of the present disclosure is a pixel circuit driving method, comprising: receiving an image signal by a control circuit, wherein the image signal comprises a plurality of pixel values; using a first lookup table to obtain a plurality of first voltage data corresponding to the plurality of pixel values in a first original frame; using a second lookup table to generate a plurality of first voltage combinations according to the plurality of first voltage data, wherein each of the plurality of first voltage combinations comprises a plurality of update voltages, and the plurality of first voltage combinations correspond to a plurality of first update frames; generating the plurality of update voltages to a plurality of driving multiplexing circuits according to each of the plurality of first voltage combinations by a plurality of power generating circuits; and using the plurality of update voltages as a plurality of driving voltages to provided to a plurality of pixel circuits by the plurality of power generating circuits.

Another aspect of the present disclosure is a driving controller, comprising a control circuit, a memory, multiple power generating circuits and multiple driving multiplexing circuits. The control circuit is configured to receive an image signal. The image signal comprises multiple pixel values. The memory is coupled to the control circuit, and records a first lookup table and a second lookup table. The first lookup table records a corresponding relationship between the pixel values and multiple voltage data. The control circuit is configured to use the first lookup table to obtain multiple first voltage data corresponding to the pixel values in a first original frame. The control circuit is configured to use the second lookup table to generate multiple first voltage combinations according to the multiple first voltage data. Each of the multiple first voltage combinations comprise multiple update voltages, and the multiple first voltage combinations correspond to multiple first update frames. The power generating circuits are coupled to the control circuit, and are configured to generate the update voltages according to each of the multiple first voltage combinations. The driving multiplexing circuits are coupled to the power generating circuits and multiple pixel circuits, and are configured to use the multiple update voltages generated by the multiple power generating circuits as multiple driving voltages to provided to the multiple pixel circuits.

Another aspect of the present disclosure is a display panel, comprising multiple pixel circuits and a driving controller. The driving controller is coupled to the multiple pixel circuits, and is configured to receive an image signal. The image signal comprises multiple pixel values, and the multiple pixel values corresponding to multiple voltage data in a first original frame. The driving controller is configured to convert the multiple voltage data into multiple voltage combinations in multiple update frames, and is configured to generate multiple driving voltages according to the multiple voltage combinations to drive the multiple pixel circuits.

Another aspect of the present disclosure is a display panel, comprising multiple pixel circuits and a driving controller. The driving controller is coupled to the multiple pixel circuits, and is configured to receive an image signal, wherein the image signal comprises multiple pixel values. The driving controller is configured to generate multiple driving voltages to drive the multiple pixel circuits in multiple update frames. At a same one of the multiple update frames, the multiple driving voltages provided by the driving controller comprises a reference voltage value and multiple symmetrical voltage groups. Each group of the plurality of symmetrical voltage groups comprises two voltage that have a same value but are positive and negative to each other.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
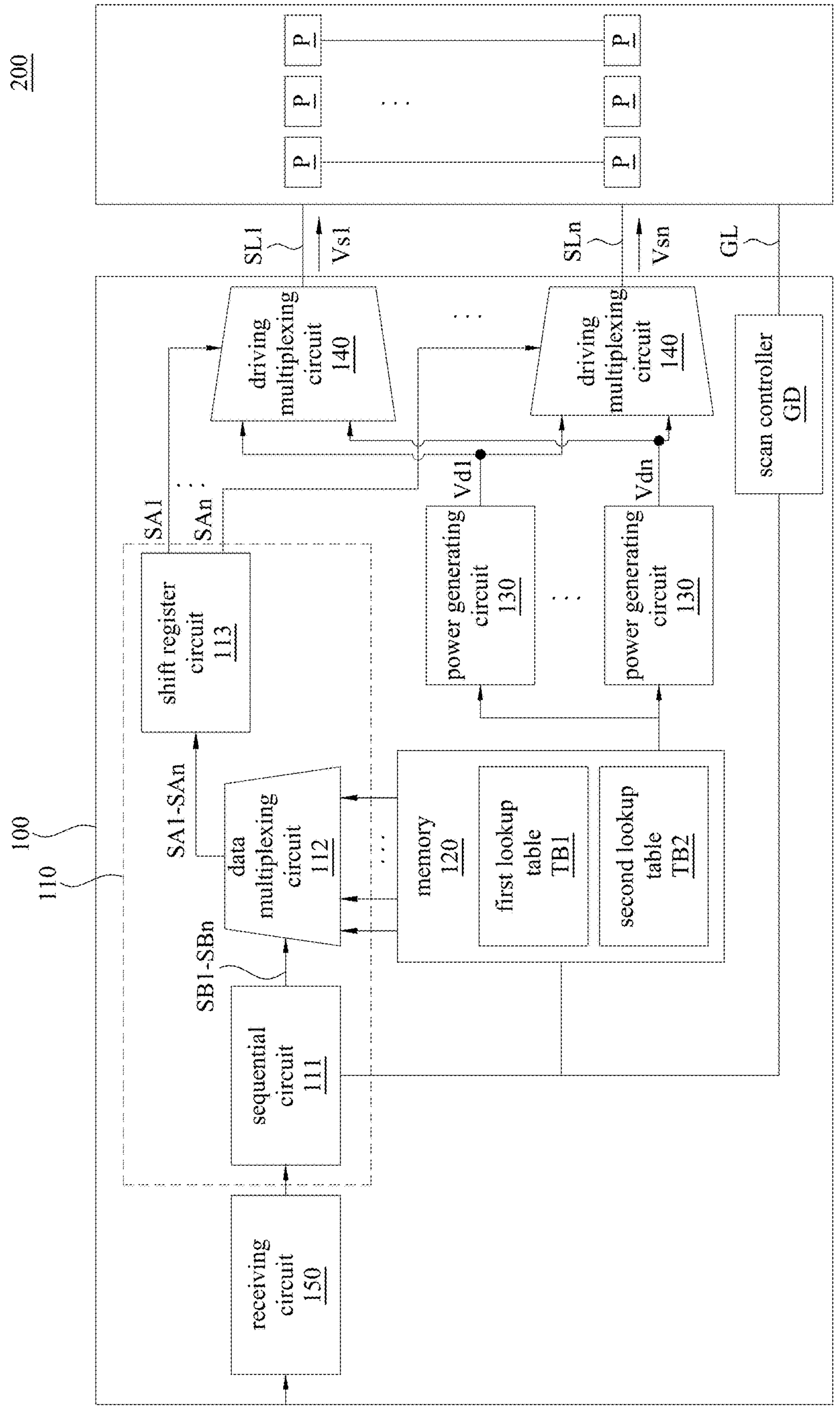
FIG. 1 is a schematic diagram of a display panel and a driving controller in some embodiments of the present disclosure.

FIG. 1 is a schematic diagram of a display panel 200 in some embodiments of the present disclosure. The display panel 200 can be applied to a reflective display device, includes multiple pixel circuits P and a driving controller 100. The driving controller 100 is coupled to the pixel circuits P by multiple transmission lines SL1-SLn (source line) and multiple control lines GL (gate line). The driving controller 100 is configured to receive an image signal, and to provide a driving voltage corresponding to the image signal to pixel circuits P, so that the display panel 200 displays an expected screen. Since one of ordinary skill in the art can understand the display panel 200, thus they are not further detailed herein.

In one embodiment, the driving controller 100 is arranged in the display panel 200, and includes a control circuit 110, a memory 120, multiple power generating circuits 130 and multiple driving multiplexing circuits 140. The control circuit 110 can be a kind of timing controller, and is coupled to the receiving circuit 150 to receive the image signal. The image signal is configured to record data of static images or dynamic images, and includes multiple pixel values (e.g., grayscale value, between 0-255) corresponding to pixel circuits P. For ease of explanation, "image signal" described in subsequent paragraphs represents the image data used by the display panel 200 in an update period. The update period can be divided into one or more original frames. The image signal includes multiple pixel values corresponding to the pixel circuits P, and each pixel value corresponds to require voltage data in one or more original frames (e.g., voltage value, or a voltage code corresponding to the voltage value).

In one embodiment, the image signal can be transmitted by a host device (not shown in figure, such as computer, phone or server) to the driving controller 100. In other embodiments, the image signal can be generated by a processor of the reflective display device (e.g., electronic paper reader), and is transmitted to the receiving circuit 150.

The memory 120 is coupled to the control circuit 110, and the memory 120 includes a first lookup table TB1 and a second lookup table TB2. The first lookup table TB1 is configured to record a corresponding relationship between each pixel value and multiple voltage data, wherein "voltage data" may includes voltage value or voltage code. After the control circuit 110 receives the image signal, the control circuit 110 may obtain the voltage data corresponding to each pixel value according to the first lookup table TB1.

For example, the control circuit 110 convert the pixel value "150" into multiple voltage codes "010, 001, 000" (the combination of multiple voltage codes is called an "original encoding sequence"). This voltage codes corresponding to multiple original frames in sequence, such as "010, 001, 000", and it means that the pixel circuit P must be applied with three different levels of voltage such as "3V, −3V, 0V" in the three original frames. The voltage code is a code used for identification, and its coding rules can be adjusted according to needs.

The second lookup table TB2 is configured to record a corresponding relationship between the voltage data (e.g., voltage code, voltage value or original encoding sequence) and multiple update encoding sequences. The update encoding sequence includes multiple converted voltage data, and corresponds to multiple update frames.

For example, one of the voltage code "010" in the above original encoding sequence "010, 001, 000" can be convert into three new voltage codes to represent, such as "000, 010, 000" (i.e., an update encoding sequence). The two other voltage codes in the original encoding sequence can be respectively converted into two update encoding sequences. Each update encoding sequence corresponds to one update frame. Therefore, the control circuit 110 converts each original encoding sequence into multiple update encoding sequences, and each original frame will correspond to multiple update frames. The detailed conversion method will be detailed in the subsequent paragraphs.

On the other hand, the process of "converting multiple original encoding sequences corresponding to multiple pixel values into multiple update encoding sequences by the driving controller 100" can be regard as the driving controller 100 converts voltage data corresponding to multiple pixel values into multiple voltage combinations corresponding to multiple update frames. Each voltage combination represents voltages with different levels (referred to here as "update voltages") corresponding to a same update frame. In other words, the driving controller 100 uses multiple voltage codes corresponding to a same update frame in multiple update encoding sequence as one voltage combination, so as to drive pixel circuits P sequentially.

For example, after the control circuit 110 obtain the image signal, the control circuit 110 generates multiple voltage combinations according to multiple voltage data (e.g., multiple original encoding sequences) of the first original frame. Each voltage combination includes multiple update voltages, and respectively corresponds to one update frame.

The power generating circuit 130 is coupled to the control circuit 110, and is configured to generate multiple update voltages Vd1-Vd3 (e.g., three voltages) according to each voltage combination generated by the control circuit 110, so as to drive pixel circuits P. In one embodiment, a number of the power generating circuits 130 is equal to a number of voltage codes in the voltage combination, but less than a number of voltage codes in the same original frame.

The driving multiplexing circuit 140 is coupled to the power generating circuit 130 and the pixel circuits P, and is configured to use the update voltages Vd1-Vdn generated by the power generating circuit 130 as driving voltages Vs1-Vsn and apply to pixel circuits P. In one embodiment, during multiple update frames, each driving multiplexing circuit 140 receives the update voltages Vd1-Vdn generated by the power generating circuit 130. The driving multiplexing circuit 140 selects one of the update voltages as a driving voltage, and outputs the driving voltage (the selected update voltage) to the corresponding pixel circuit P.

Since the pixel value of each the pixel circuit P are not exactly the same, the required voltages are also different, in the common method, to complete the update in the original frame, the driving controller 100 needed to generate different levels of the driving voltages by a large number of power generating circuits 130. However, this will require configuring a large number of the power generating circuits 130, so the cost and size of the driving controller 100 will be difficult to control.

The present disclosure divides an original frame into multiple update frames, so the driving controller 100 can generate a less number of voltages in each update frame. Accordingly, there is no need to configure a large number of the power generating circuits 130. For example, in the common method, the image signal indicates that "one original frame need seven different driving voltages", and thus it needs to arrange seven power generating circuits. In one embodiment of the present disclosure, the original frame is divided multiple update frames (e.g., three), so each update frame can only generate a few update voltages (e.g., three). Accordingly, during multiple update frames, this power generating circuits 130 sequentially updates seven pixel values corresponding to different driving voltages.

In other words, each update frame corresponds to one voltage combination, and each voltage combination includes multiple update voltages (e.g., three). The update voltage in each voltage combination are not exactly the same, but can be partly the same (e.g., all includes a reference voltage"0V"). Therefore, the number of the update voltage is equal to the number of the power generating circuits 130, but is less than the number of driving voltages corresponding to all pixel values (e.g., seven) in the same original frame.

In addition, during each update frame, the control circuit 110 is further configured to sequentially output multiple driving selection signals SA1-SAn to the driving multiplexing circuits according to the update encoding sequence corresponding to each pixel value (pixel circuit P), so that each driving multiplexing circuit 140 selectively uses one of the update voltage as the driving voltage according to the received driving selection signals SA1-SAn, and provides the driving voltage to the pixel circuit P.

For ease of understanding, the description of subsequent embodiments will be based on two methods of driving the pixel circuits P according to "original frame" of the common method, and driving the pixel circuits P according to "update frame" of the present disclosure.

Figure 2:
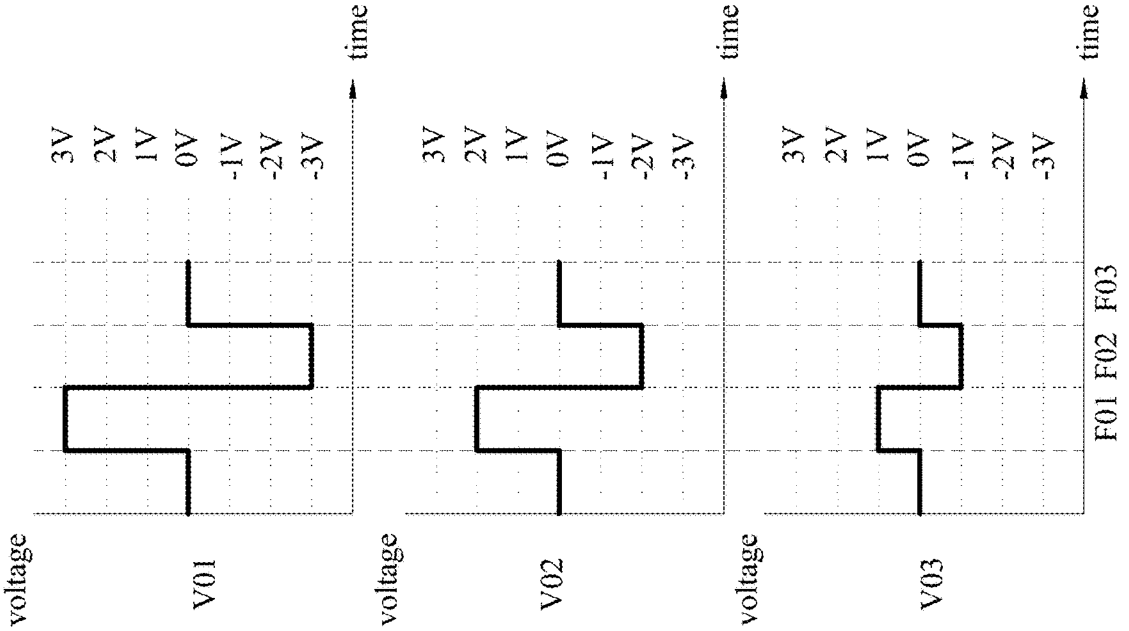
FIG. 2 is a signal waveform diagram for driving a pixel circuit according to original frames in some embodiments of the present disclosure.

FIG. 2 is a signal waveform diagram for driving the pixel circuits P according to original frames in some embodiments of the present disclosure. This embodiment do not use the second lookup table TB2 shown in FIG. 1. For example, the image signal indicates that updating the pixel values of three pixel circuits P in the same row to "120, 85, 60". Taking the pixel value "120" as an example, the display panel will find the corresponding multiple voltage codes "010, 001, 000" according to the first lookup table TB1 shown in FIG. 1 (three are used as an example here, but the number is not limited to this). These voltage codes corresponding to the same pixel value are an "original encoding sequence", and can be identified as multiple voltage values "3V, −3V, 0V". In other words, the display panel needs to sequentially provide different levels of voltage (signal V01 shown in FIG. 2 "3V, −3V, 0V") by the power generating circuits in the three original frames F01, F02, and F03. These voltages will be provided as a driving voltage V01 to the corresponding pixel circuit P, so that the pixel circuit P can display the pixel value "120".

Both of "voltage code" or "voltage value" can be used to the above voltage data. In some embodiments, although the driving controller 100 internally uses the voltage code as a signal for transmission, in other embodiments, the driving controller 100 may directly use the voltage value as a signal for transmission.

Similarly, taking the pixel value "85" as an example, the display panel finds the corresponding multiple voltage codes "001, 101, 000" (original encoding sequence) according to the first lookup table TB1 shown in FIG. 1, and identifies multiple voltage values "2V, −2V, 0V". In other words, the display panel needs to sequentially provide different levels of voltage by the specific power generating circuits in the three original frames F01, F02, and F03 (as shown in FIG. 2, the driving voltage V02 "2V, −2V, 0V"), so that the pixel circuits P can display the pixel value "85".

Similarly, taking the pixel value "6" as an example, the display panel finds the corresponding multiple voltage codes "011, 100, 000" (original encoding sequence) according to the first lookup table TB1 shown in FIG. 1, and identifies multiple voltage values "1V, −1V, 0V". In other words, the display panel needs to sequentially provide different levels of voltage by the specific power generating circuits in the three original frames F01, F02, and F03 (as shown in FIG. 2, the driving voltage V02 "1V, −1V, 0V"), so that the pixel circuits P can display the pixel value "60".

As mentioned in the previous embodiment, in order to simultaneously update the pixel values of multiple pixel circuits P, in the first original frame F01, the driving controller 100 must simultaneously provide multiple different levels of the driving voltage "3V, 2V, 1V". In practical applications, hundreds or thousands of the pixel circuits P need to be updated in each original frame. Therefore, more driving voltages are required in each original frame. As a result, a large number of the power generating circuits 130 will be required, resulting in the cost of the display panel 200 being too high.

Figure 3A:
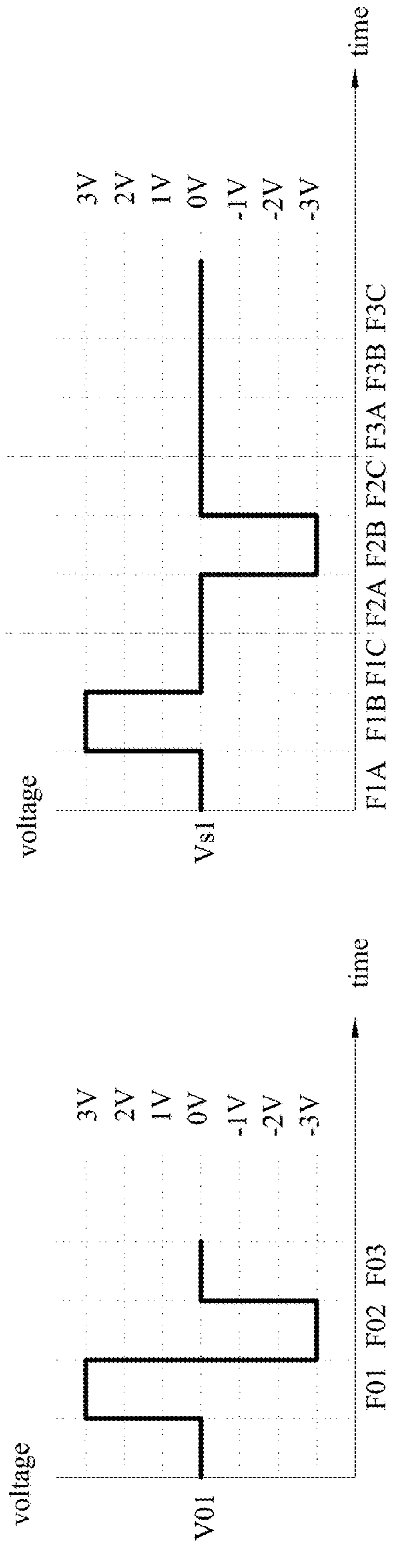
FIGS. 3A-3C are schematic diagrams of driving a pixel circuit according to update frames in some embodiments of the present disclosure.
Figure 3B:
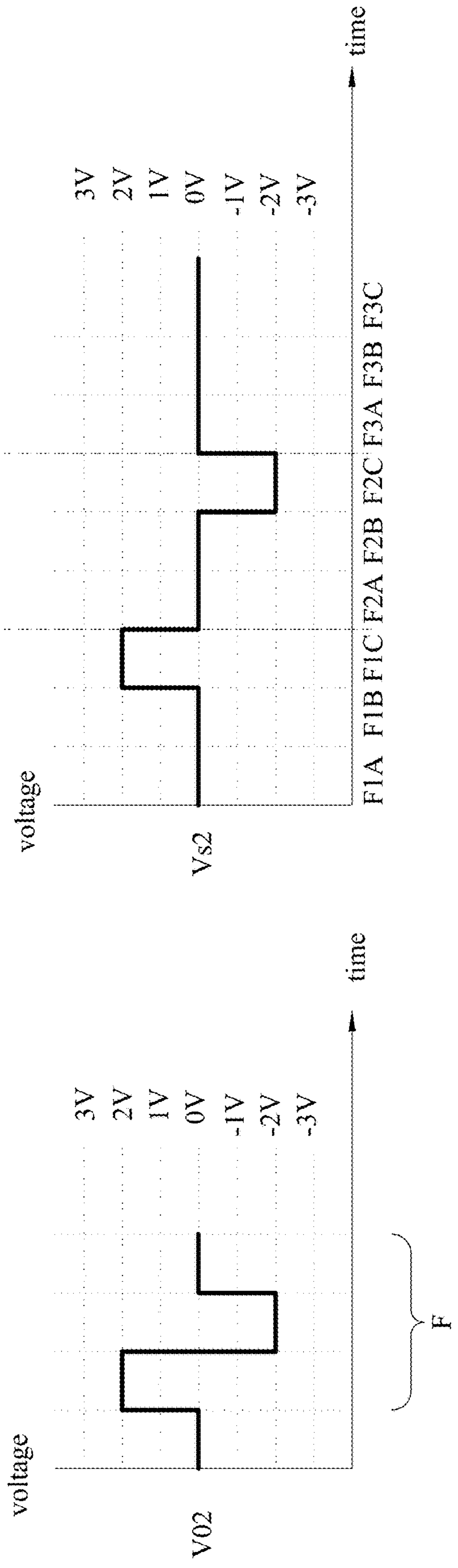
Figure 3C:
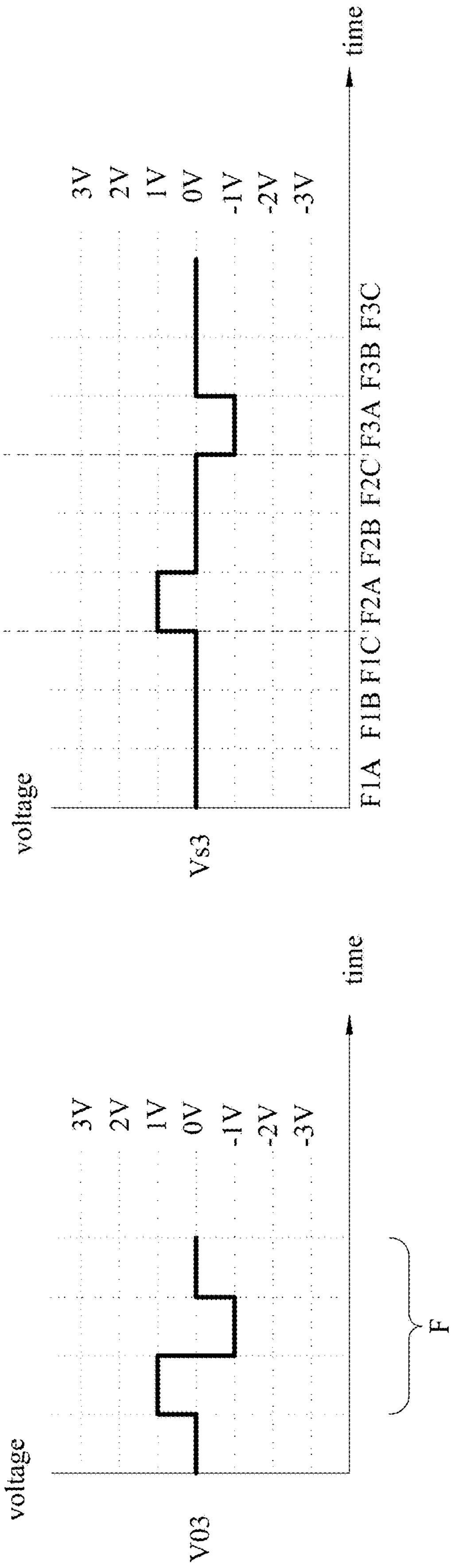

FIGS. 3A-3C are schematic diagrams of driving the pixel circuit P according to update frames in some embodiments of the present disclosure. In this embodiment, the second lookup table TB2 shown in FIG. 1 will be used. After the control circuit 110 uses the first lookup table TB1 to obtain the voltage data corresponding to the pixel values in original frames F01-F03, the control circuit 110 uses the second lookup table TB2 generates a voltage combination according to multiple voltage data required in each original frame. This voltage combination includes multiple update voltages, and corresponding to multiple update frames.

On the other hand, the control circuit 110 uses the second lookup table TB2 to convert each original encoding sequence into multiple update encoding sequences in multiple update frame, so as to control the power generating circuit 130 to sequentially generate the update voltage according to each update frame. In other word, the original encoding sequence in the same original frame will be converted to multiple update encoding sequences in multiple update frames.

For example, as shown in FIG. 3A, the original encoding sequence "010, 001, 000" indicates that the power generating circuit 130 needs to sequentially generate three voltage values "3V, −3V, 0V" in three original frames F01-F03. The control circuit 110 uses the second lookup table TB2 to each convert voltage codes in the original encoding sequence into an update encoding sequence. For example, converting the voltage code "010" (corresponding to 3V) in the original frame F01 to an update encoding sequence "000, 010, 000" corresponding to multiple update frames F1A-F1C. Multiple driving codes in this update encoding sequence are configured to represent different update voltages, as shown in FIG. 3A as "0V, 3V, 0V".

Similarly, the voltage code "001" (corresponding to −3V) in the original frame F02 will be converted into an update encoding sequence "000, 001, 000" corresponding to multiple update frames F2A-F2C, such as voltage value "0V, −3V, 0V". The voltage code "000" (corresponding to 0V) in the original frame F03 will be converted to an update encoding sequence "000, 000, 000" corresponding to multiple update frames F3A-F3C, such as update voltage "0V, 0V, 0V".

Similarly, as shown in FIG. 3B and FIG. 3C, other original encoding sequences (corresponding to different the pixel circuits P) will also be converted into update encoding sequences corresponding to multiple update frames in the same way.

For ease of understanding, the driving voltages required for the two methods of "driving according to original frames" and "driving according to update frames" is listed in a table as follows.

The following is the corresponding relationship between the pixel values and the voltage data when driving according to original frames. In one embodiment, the image signal is configured to indicate to update/display pixel values of multiple pixel circuits P (there are only four pixel values listed in the table).

| the original frame | F01 | F02 | F03 |
|---|---|---|---|
| the pixel value 120 | 3 V | −3 V | 0 V |
| the pixel value 85 | 2 V | −2 V | 0 V |
| pixel value 60 | 1 V | −1 V | 0 V |
| pixel value 20 | 0 V | 0 V | 1 V |

The following is the corresponding relationship between the pixel values and the voltage data when driving according to update frames. In one embodiment, the image signal is configured to indicate to update/display pixel values of multiple pixel circuits P (there are only four pixel values listed in the table).

| | the update frame | | | | | | |
|---|---|---|---|---|---|---|---|
| | F1A | F1B | F1C | F2A | F2B | F2C | . . . |
| pixel value 120 | 3 V | 0 V | 0 V | −3 V | 0 V | 0 V | . . . |
| the pixel value 85 | 0 V | 2 V | 0 V | 0 V | −2 V | 0 V | . . . |
| the pixel value 60 | 0 V | 0 V | 1 V | 0 V | 0 V | −1 V | . . . |
| the pixel value 20 | 0 V | 0 V | 0 V | 0 V | 0 V | 0 V | . . . |

Figure 4:
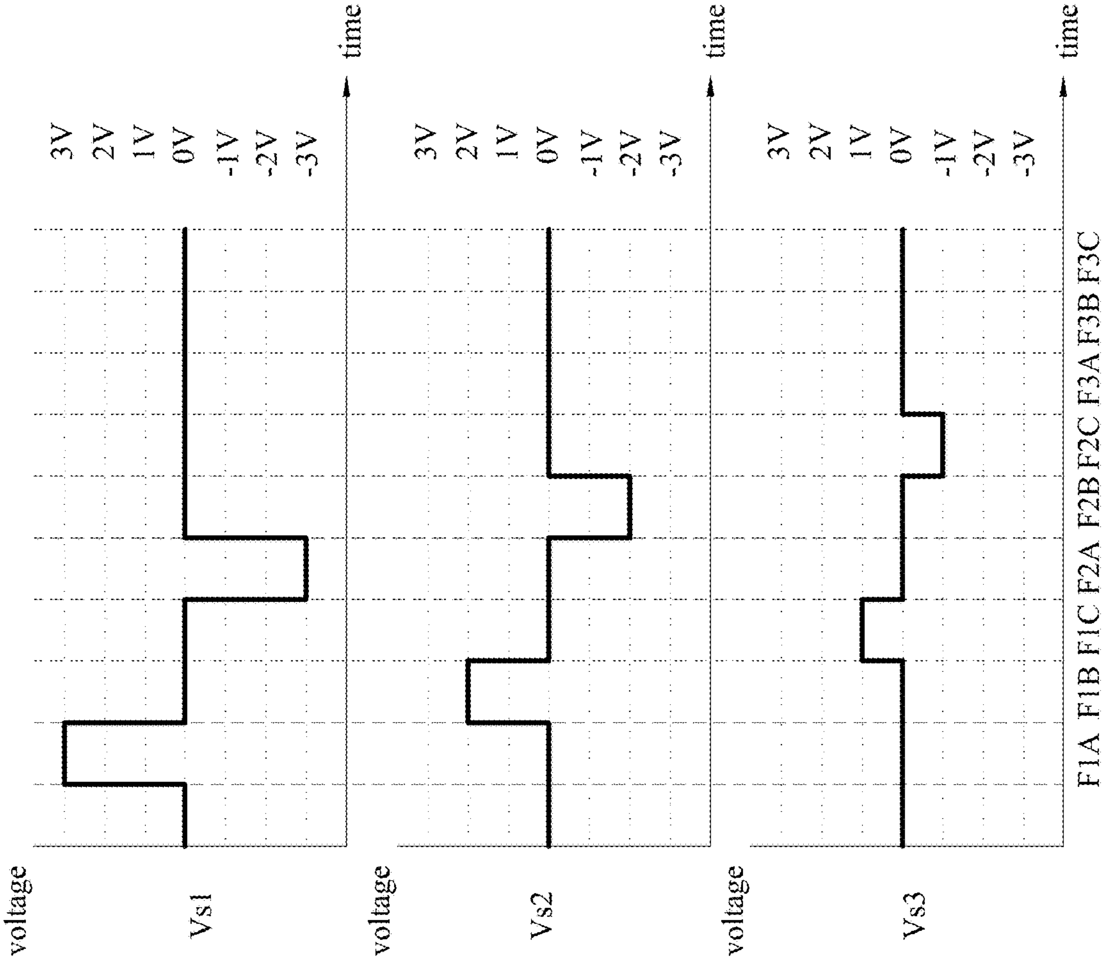
FIG. 4 is a signal waveform diagram of driving the pixel circuit in some embodiments of the present disclosure.

FIG. 4 is a signal waveform diagram of driving the pixel circuit P according to update frames in some embodiments of the present disclosure. Please refer to FIG. 1 and FIG. 4 and the above table, the control circuit 110 of the driving controller 100 converts the original encoding sequence into multiple update encoding sequences through the first lookup table TB1 and the second lookup table TB2. For example, to convert the original encoding sequence "3V, −3V, 0V" corresponding to the pixel value "120" into three update encoding sequences, such as a first update encoding sequence "3V, 0V, 0V" corresponding to the first update frames F1A-F1C, a second update encoding sequence "−3V, 0V, 0V" corresponding to a second update frame, and a third update encoding sequence "−3V, 0V, 0V" corresponding to a third update frame (for ease of understanding, it is represented as a voltage value here, but it can actually be represented by a binary code). The update voltage corresponding to each update frame in the above table is "voltage combination". For example, the voltage combination corresponding to the update frame F1A is "3V, 0V", that is, the voltage combination includes two update voltages (driving voltage).

As mentioned above, the second lookup table TB2 includes a conversion relationship between the voltage data (e.g., the voltage code, the voltage value or the original encoding sequence) and multiple update encoding sequences. In one embodiment, "conversion relationship" can be a conversion formula or a conversion rule. For example, when converting the voltage values (or the voltage codes) corresponding to the same original frame into the voltage values corresponding to the update frames F1A-F1C, in addition to setting one of the voltage values to correspond to one of the update frames (e.g., 3V corresponds to the update frame F1A), other update frames are set to a reference voltage value (e.g., 0V corresponds to the update frames F1B, F1C). The number of voltage values corresponding to the same update frame must be equal to or less than "the number of the power generating circuits 130 in the driving controller 100". In addition, the conversion rules may include an update encoding sequence, or a provided sequence of voltage values in the voltage combination. For example, in multiple update frames F1A-F1C, the required voltage values are arranged from high to low (e.g., 3V is generated during the update frame F1A, 2V is generated during the update frame F1B, and 1V is generated during the update frame F1C). The conversion relationship or conversion rules recorded by the second lookup table TB2 can be adjusted according to needs and are not limited to the above embodiment.

The present disclosure converts an original frame into multiple update frames, so the number of the update voltages Vd1-Vdn (or the driving voltages Vs1-Vsn) required in the same update frame will be reduced. Referring to FIG. 2 and FIG. 4, or as shown in the table above, in the original frame F01, the driving controller 100 originally needed to provide three driving voltages "3V, 2V, 1V" at the same time, that is, it needs three power generating circuits 130. Correspondingly, in each frame of the update frames F1A-F1C, the driving controller 100 only needs to provide update voltages with two different levels. For example, the update frame F1A is "3V, 0V". Comparing FIG. 2 and FIG. 4, the number (e.g., two) of levels of driving voltages required for each of update frames F1A-F1C is less than the number of levels of the driving voltages required in the original frame F01 (e.g., three, "3V, 2V, 1V").

In the aforementioned embodiment, the common driving method of "original frame" needs to generate three driving voltages at the same time, while the driving method of "update frame" needs to generate two driving voltages at the same time. However, the foregoing embodiments are only simplified examples. In fact, the common driving method of "original frame" may require 5-10 or even more driving voltages in the same original frame. The driving method of "update frame" can provide only three driving voltages in the same update frame.

In one embodiment, in the update frame, the driving voltages Vs1-Vsn provided by the driving controller 100 includes a reference voltage value and multiple symmetrical voltage groups. Each group of symmetrical voltage groups comprises two voltages that have a same value but are positive and negative to each other. For example, the symmetrical voltage group corresponding to the update frame F1A includes "3V, 0V, −3V" (FIG. 4 only shows the driving voltages required by the first three pixel circuits P.) Similarly, the symmetrical voltage group corresponding to the update frame F1B includes "2V, 0V, −2V", and the symmetrical voltage group corresponding to the update frame F1C includes "1V, 0V, −1V".

In one embodiment, the control circuit 110 uses a part of "the voltage data corresponding to the same original frame" as the update voltages Vd1-Vdn to generate the driving voltages Vs1-Vsn, and a number of this part of the plurality of first voltage data is equal to a number of the plurality of power generating circuits 130 in the driving controller 100. As shown in the aforementioned table, the control circuit 110 selects "3V, 0V" from the voltage data "3V, 2V, 1V, 0V . . . " corresponding to the original frame F01 as the update voltages corresponding to the update frame F1A. Similarly, the control circuit 110 further selects "2V, 0V" from the voltage data "3V, 2V, 1V, 0V . . . " as the update voltages corresponding to the update frame F1B.

Figure 5:
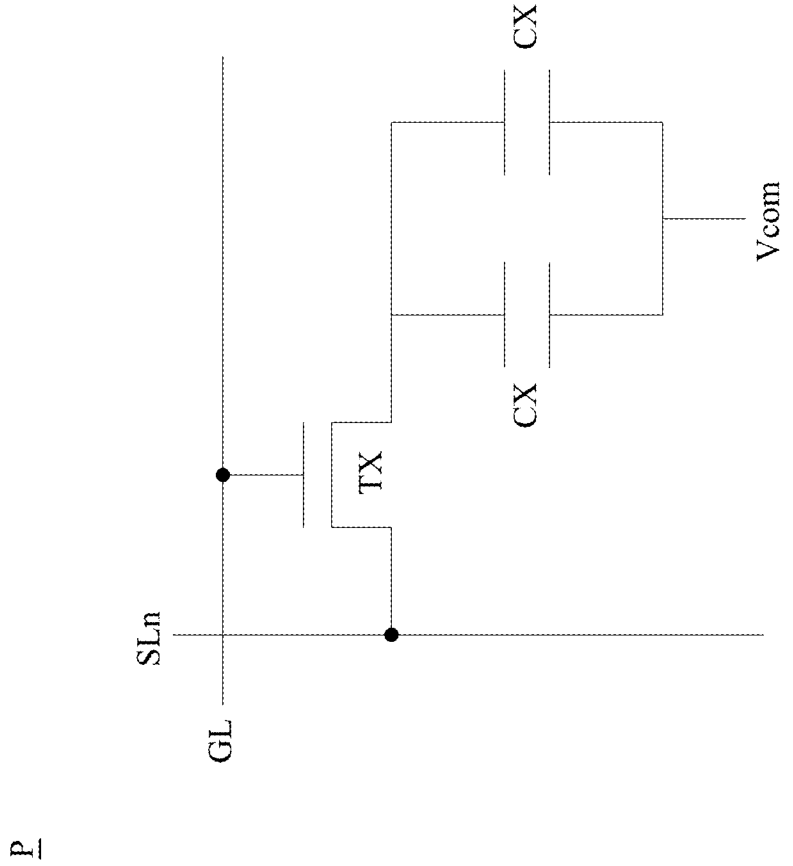
FIG. 5 is a schematic diagram of the pixel circuit in some embodiments of the present disclosure.

As mentioned above, in the same update frame, the voltage combination may not include voltages required by all pixel circuits P. Therefore, the driving controller 100 uses a reference voltage of the pixel circuits P as one of the update voltages. FIG. 5 is a schematic diagram of the pixel circuit P in some embodiments of the present disclosure. The pixel circuits P includes a transistor switch TX and at least one capacitor CX. When a scan controller GD of the driving controller 100 transmits a scan voltage to the control line GL to turn on the control terminal of the transistor switch TX, the transistor switch TX receives the driving voltage provided by the driving controller 100 through the transmission line SLn. At this time, the driving voltage will charge the capacitor CX. A common voltage connected to one terminal of the capacitor CX is the reference voltage Vcom.

For example, in the original frame F01, the driving voltage required for the pixel circuits P corresponding to the pixel value "85" is 2V. However, after the original frame F01 is converted into multiple update frames F1A-F1C, the driving controller 100 do not provide the update voltage of 2V during the update frame F1A. At this time, the driving controller 100 provides the reference voltage (i.e., 0V) to the pixel circuits P corresponding to the pixel value "85". In other words, each voltage combination can include the reference voltage "0V".

In one embodiment, the number (e.g., two) of the update voltages in each update frame is equal to the number of the power generating circuits 130, but this number is less than the number of the driving voltages required in the same original frame (as in the previous table, the driving voltages corresponding to the original frame F01 have four different levels "3V, 2V, 1V, 0V").

Referring to FIG. 1, although each driving multiplexing circuit 140 receives all update voltages Vd1-Vdn provided by the power generating circuits 130, each driving multiplexing circuit 140 will only selectively use one of the update voltages Vd1-Vdn as the driving voltages Vs1-Vsn according to the corresponding driving selection signal. The control circuit 110 generates the driving selection signals SA1-SAn corresponding to each update frame according to the voltage required by the pixel circuit P during different update frames.

In some embodiments, the control circuit 110 further includes a sequential circuit 111, a data multiplexing circuit 112 and a shift register circuit 113. The sequential circuit 111 is coupled to the memory 120 and the receiving circuit 150, and is configured to obtain original encoding sequences corresponding to the pixel value, update encoding sequence and the voltage combination corresponding to each update frame according to the first lookup table TB1 and the second lookup table TB2. The sequential circuit 111 is further configured to sequentially generate multiple timing selection signals SB1-SBn according to the update encoding sequence during the update frames F1A-F3C. The timing selection signals SB1-SBn is configured to cause the driving multiplexing circuit 140 selectively outputs anyone of the driving voltage Vs1-Vs3 (i.e., outputs one of the update voltages Vd1-Vdn as the driving voltage) to the corresponding pixel circuit P.

The data multiplexing circuit 112 is coupled to the sequential circuit 111. During the update frames F1A-F3C, a selective terminal of the data multiplexing circuit 112 is configured to sequentially receive the timing selection signals SB1-SBn, and the input terminal of the data multiplexing circuit 112 receives the voltage combination corresponding to the current update frame (or receives all voltage values or all voltage codes corresponding to the original frame). The data multiplexing circuit 112 outputs multiple driving selection signals SA1-San according to the timing selection signals SB1-SBn. Each of the driving selection signals SA1-San corresponds to each of the driving multiplexing circuits 140. As shown in FIG. 1, the driving selection signals SA1 corresponds to the transmission line SL1 (i.e., the pixel circuits P in the first row), the driving selection signals SAn corresponds to the transmission line SLn. Since one of ordinary skill in the art can understand the method of using multiplexers to select the output signal, thus they are not further detailed herein.

The shift register circuit 113 (e.g., a shift register) is coupled to the data multiplexing circuit 112 and the driving multiplexing circuit 140, and is configured to allocate multiple driving selection signals SA1-SAn to the corresponding driving multiplexing circuit 140 respectively. During the update frames F1A-F1C, the driving multiplexing circuit 140 sequentially receives the update voltages generated by all power generating circuits 130, and uses one of the update voltages as the driving voltage according to the driving selection signals SA1-SAn to output the corresponding driving voltage to the corresponding pixel circuit P.

For example, during the first update frame F1A, the update voltage required by the pixel circuits P is 3V, and the update voltage provided by the power generating circuits 130 is 3V and 0V. The driving multiplexing circuit 140 receives all update voltages (3V, 0V) at the same time, but will only output an update voltage "3V" corresponding to the update encoding sequence according to the driving selection signals SA1-SAn.

Figure 6:
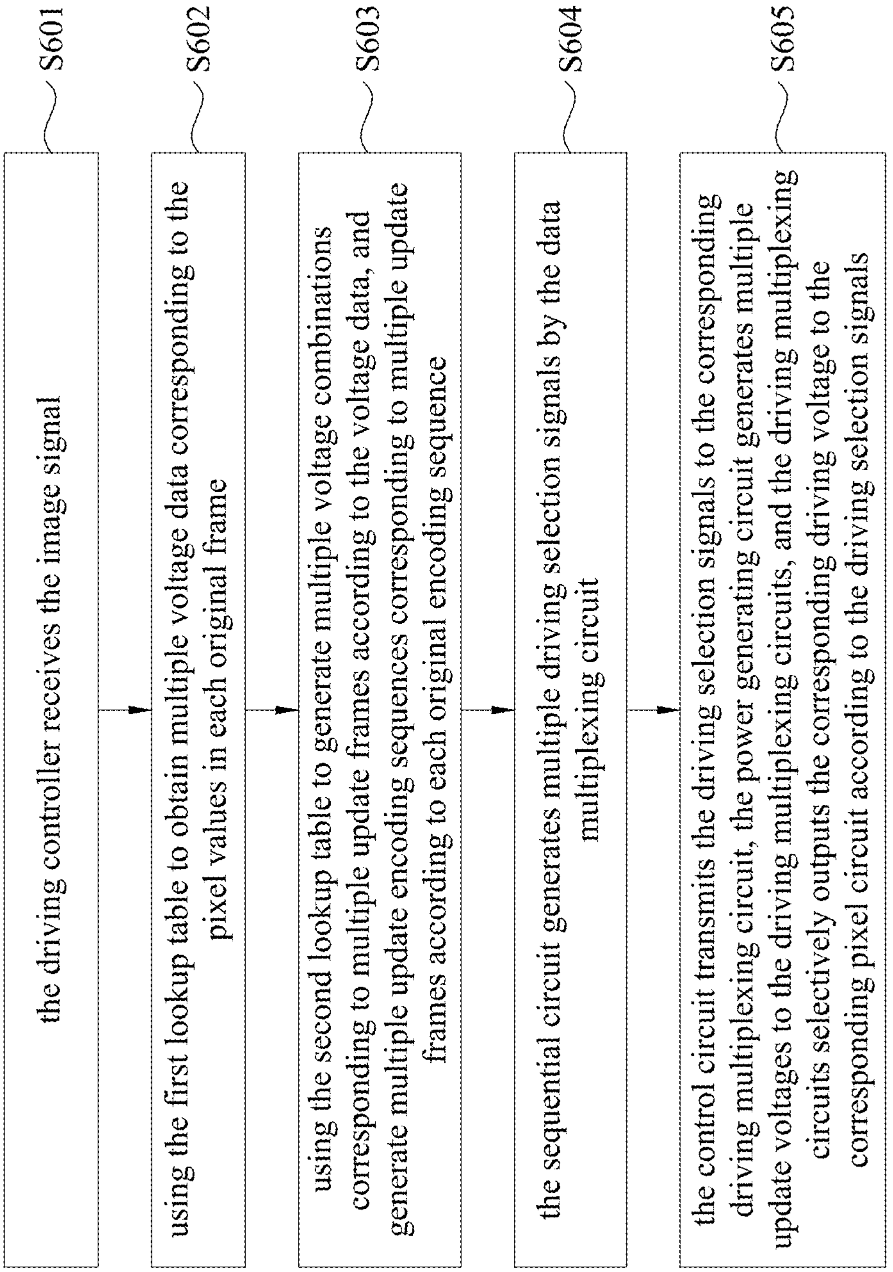
FIG. 6 is a flowchart diagram of a pixel circuit driving method in some embodiments of the present disclosure.

FIG. 6 is a flowchart diagram of a pixel circuit driving method in some embodiments of the present disclosure. In step S601, the sequential circuit 111 of the control circuit 110 receives the image signal from the receiving circuit 150. In one embodiment, the image signal includes multiple pixel values corresponding to multiple pixel circuits P.

In step S602, the sequential circuit 111 of the control circuit 110 uses the first lookup table TB1 to obtain multiple voltage data corresponding to the pixel values in each original frame, wherein each original frame corresponds to multiple voltage data. The first lookup table TB1 records a corresponding relationship between each pixel value and the voltage data, as shown in the previous table, the voltage data corresponding to the pixel value "120" in the original frame F01 can be a voltage code "010" or a voltage value "3V".

In step S603, after obtaining the voltage data, the sequential circuit 111 of the control circuit 110 uses the second lookup table TB2 to generate multiple voltage combinations corresponding to multiple update frames according to the voltage data, and generate multiple update encoding sequences corresponding to multiple update frames according to each original encoding sequence. Each voltage combination includes multiple update voltages, and corresponds to multiple update frames.

"Generating the voltage combination" and "generating the updated encoding sequence" are two actions in one. In one embodiment, the sequential circuit 111 first generates the voltage combination corresponding to multiple update frames according to the original encoding sequence, then forms the update encoding sequence according to the update voltages corresponding to the same pixel value in multiple voltage combinations. In another embodiment, the sequential circuit 111 can first convert each original encoding sequence into multiple update encoding sequences respectively, and then use the update voltages corresponding to the same update frame in the update encoding sequences as the voltage combination. The update encoding sequences is configured to cause the power generating circuits generates the update voltages.

Specifically, in the step 602, the sequential circuit 111 first obtains multiple original encoding sequences corresponding to multiple pixel values, then uses a part of the original encoding sequences (i.e., the voltage codes corresponding to the same original frame) as the voltage data, so as to generate the voltage combination in the subsequent step S603. As shown in the previous table, the sequential circuit 111 uses multiple voltage codes or voltage values (e.g., "3V, 2V, 1V, 0V") corresponding to the original frame F01 as the voltage data, so as to generate a voltage combination corresponding to the update frames F1A-F1C.

As mentioned above, the sequential circuit 111 uses a part of the voltage data as the update voltage, and a number of this part is equal to a number of the power generating circuits in the driving controller 100. As shown in the previous table, among the multiple driving voltages corresponding to the original frame F01, the driving controller 100 will use "3V, 0V" as the update voltage corresponding to the update frame F1A, and the update voltage includes the reference voltage of the pixel circuit P. The reference voltage is not limited to "0V", it can also be other levels of voltage according to product requirements, such as 1V or 2V. Additionally, in one embodiment, all voltage combinations corresponding to all update frames F1A-F3C include the reference voltage value. In other words, update voltages in each of multiple first voltage combinations includes the reference voltage value.

In step S604, during the update frame, the sequential circuit 111 of the control circuit 110 generates multiple timing selection signals SB1-SBn to the selective terminal of the data multiplexing circuit 112 according to the update encoding sequence, and provides the voltage combination corresponding to the current update frame (or all voltage values or the voltage codes corresponding to the original frame) to the input terminal of the data multiplexing circuit 112, so that the data multiplexing circuit 112 generates the driving selection signals SA1-SAn. Each of driving selection signals SA1-San correspond to each of driving multiplexing circuits 140, and is configured to indicate that each driving multiplexing circuit 140 to select the required driving voltage according to each update encoding sequence during each update frame.

In step S605, the data multiplexing circuit 112 transmits the driving selection signals SA1-SAn to the corresponding driving multiplexing circuit 140 through the shift register circuit 113. The power generating circuit 130 generates the update voltage according to each voltage combination, and provides the update voltage to the driving multiplexing circuits 140. The driving multiplexing circuit 140 selectively uses one of the received update voltages as the driving voltage according to the driving selection signals SA1-San, and outputs the driving voltage to the corresponding pixel circuit P. At the same time, the driving controller 100 transmits the scanning signal to the control line GL through the scanning controller GD to turn on the corresponding pixel circuit. Accordingly, the pixel circuits P can sequentially receive the driving voltages during the update frames and can display the pixel value expected by the image signal.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A pixel circuit driving method, comprising:

receiving an image signal by a control circuit, wherein the image signal comprises N pixel values;

using a first lookup table to obtain P voltage data corresponding to each of the N pixel values, wherein the P voltage data are respectively provided in P original frames during one update period, wherein each of the P original frames is divided into Q update frames, wherein N, P, and Q are integers greater than one;

using a second lookup table to generate, for each of the N pixel values, P voltage combinations corresponding to the respective P voltage data, wherein each of the P voltage combinations comprises Q update voltages provided respectively in the Q update frames;

generating the Q update voltages, by a plurality of power generating circuits, to a plurality of driving multiplexing circuits according to each of the P voltage combinations; and using the Q update voltages in each of the P original frames as a respective driving voltage and providing the P driving voltages of the P original frames to a corresponding one of N pixel circuits by the plurality of power generating circuits.

2. The pixel circuit driving method of claim 1, wherein using the second lookup table to generate, for each of the N pixel values, the P voltage combinations corresponding to the respective P voltage data comprises:

using a subset of the voltage data corresponding to one of the P original frames for the N pixel values as the N update voltages in one of the Q update frames of said one of the P original frames, wherein each of the N update voltages corresponds to one of the N pixel values, wherein a number of the subset of the voltage data is equal to a number of the plurality of power generating circuits.

3. The pixel circuit driving method of claim 2, wherein one of the N update voltages is a reference voltage value of the N pixel circuits.

4. The pixel circuit driving method of claim 3, wherein each of the P voltage combinations comprises the reference voltage value.

5. The pixel circuit driving method of claim 1, wherein using the first lookup table to obtain the P voltage data corresponding to each of the N pixel values comprises:

obtaining a plurality of original encoding sequences corresponding to the N pixel values, wherein each of the plurality of original encoding sequences comprises a plurality of voltage codes, the plurality of voltage codes corresponds to the P original frames in sequence, and the original frames comprise a first original frame; and using a subset of the plurality of voltage codes corresponding to the first original frame as the voltage data in the first original frame for the N pixel values.

6. The pixel circuit driving method of claim 5, wherein using the second lookup table to generate, for each of the N pixel values, the P voltage combinations corresponding to the respective P voltage data comprises:

using the second lookup table to generate the P voltage combinations according to the plurality of original encoding sequences.

7. The pixel circuit driving method of claim 6, further comprising:

converting each one of the plurality of original encoding sequences into a plurality of update encoding sequences formed by the P voltage combinations, wherein the Q update voltages of each of the P voltage combinations are generated by the plurality of power generating circuits based on the plurality of update encoding sequences.

8. The pixel circuit driving method of claim 7, wherein using the Q update voltages in each of the P original frames as the respective driving voltage and providing the P driving voltages of the P original frames to the corresponding one of the N pixel circuits comprises:

receiving, by the plurality of driving multiplexing circuits, all of the update voltages during one of the Q update frames, and selectively outputting one of all the update voltages to the corresponding one of the N pixel circuits.

9. The pixel circuit driving method of claim 8, wherein using the Q update voltages in each of the P original frames as the respective driving voltage and providing the P driving voltages of the P original frames to the corresponding one of the N pixel circuits comprises:

sequentially generating a plurality of timing selection signals during the Q update frames according to the plurality of update encoding sequences by a sequential circuit of the control circuit, so that the plurality of driving multiplexing circuits selectively output the one of all the update voltages.

10. A driving controller, comprising:

a control circuit configured to receive an image signal, wherein the image signal comprises N pixel values;

a memory coupled to the control circuit, and recording a first lookup table and a second lookup table, wherein the control circuit is configured to use the first lookup table to obtain P voltage data corresponding to each of the N pixel values, wherein the P voltage data are respectively provided in P original frames during one update period, wherein each of the P original frames is divided into Q update frames, wherein N, P, and Q are integers greater than one;

wherein the control circuit is configured to use the second lookup table to generate, for each of the N pixel values, P voltage combinations corresponding to the respective P voltage data, wherein each of the P voltage combinations comprises Q update voltages provided respectively in the Q update frames;

a plurality of power generating circuits coupled to the control circuit, and configured to generate the Q update voltages according to each of the P voltage combinations; and a plurality of driving multiplexing circuits coupled to the plurality of power generating circuits and N pixel circuits, and configured to use the Q update voltages generated by the plurality of power generating circuits in each of the P original frames as a respective driving voltage and provide the P driving voltages of the P original frames to a corresponding one of the N pixel circuits.

11. A display panel, comprising:

N pixel circuits; and a driving controller coupled to the N pixel circuits, and configured to receive an image signal, wherein the image signal comprises N pixel values, and each of the N pixel values corresponds to P voltage data, wherein the N pixel circuits respectively display the N pixel values during an update period, wherein the update period comprises P original frames and each of the P original frames is divided into Q update frames, wherein each of the N pixel values corresponds to a combination of P voltage data in the P original frames, respectively, wherein N, P, and Q are integers greater than one;

wherein the driving controller is configured to convert the P voltage data into P voltage combinations, and is configured to generate Q update voltages respectively in the Q update frames of each of the P original frames for each of the N pixel circuits, wherein a combination of the Q update voltages corresponds to one of the P voltage combinations.

12. The display panel of claim 11, wherein the driving controller is configured to obtain a plurality of original encoding sequences corresponding to the N pixel values, and each of the plurality of original encoding sequences is formed by the P voltage data in the P original frames corresponding to one of the N pixel values; and wherein the driving controller is further configured to convert each of the plurality of original encoding sequences into a plurality of update encoding sequences.

13. A display panel, comprising:

N pixel circuits; and a driving controller coupled to the N pixel circuits, and configured to receive an image signal, wherein the image signal comprises N pixel values, wherein the N pixel circuits respectively display the N pixel values during an update period;

wherein the update period comprises P original frames and each of the P original frames is divided into Q update frames, wherein each of the N pixel values corresponds to a combination of P driving voltages in the P original frames, respectively, wherein N, P, and Q are integers greater than one;

wherein the driving controller is configured to generate Q update voltages respectively in the Q update frames of each of the P original frames for each of the N pixel circuits, wherein a combination of the Q update voltages corresponds to one of the P driving voltages;

wherein for the N pixel circuits, in a same one of the Q update frames of one of the P original frames, the update voltages provided by the driving controller comprise a reference voltage value and a plurality of symmetrical voltage groups, and each group of the plurality of symmetrical voltage groups comprises two voltages that have a same value but are positive and negative to each other.

* * * * *